(12) United States Patent
Muuronen et al.

(10) Patent No.: US 10,993,451 B2
(45) Date of Patent: May 4, 2021

(54) MODIFICATION OF MINERAL COMPOSITION OF MILK FOR THE PRODUCTION OF AN ACIDIFIED MILK PRODUCT

(71) Applicant: VALIO LTD, Helsinki (FI)

(72) Inventors: Klaus Muuronen, Helsinki (FI); Riitta Partanen, Helsinki (FI)

(73) Assignee: VALIO LTD., Helsinki (FI)

( * ) Notice: Subject to any disclaimer, the term of this patent is extended or adjusted under 35 U.S.C. 154(b) by 111 days.

(21) Appl. No.: 16/061,942

(22) PCT Filed: Dec. 15, 2016

(86) PCT No.: PCT/FI2016/050878
§ 371 (c)(1),
(2) Date: Jun. 13, 2018

(87) PCT Pub. No.: WO2017/103336
PCT Pub. Date: Jun. 22, 2017

(65) Prior Publication Data
US 2018/0368430 A1 Dec. 27, 2018

(30) Foreign Application Priority Data
Dec. 16, 2015 (FI) ................................... 20155958

(51) Int. Cl.
| | | |
|---|---|---|
| *A23C 9/142* | (2006.01) | |
| *A23C 9/13* | (2006.01) | |
| *A23C 13/16* | (2006.01) | |
| *A23C 19/076* | (2006.01) | |
| *A23C 9/123* | (2006.01) | |

(52) U.S. Cl.
CPC ............ *A23C 9/1422* (2013.01); *A23C 9/123* (2013.01); *A23C 9/1307* (2013.01); *A23C 9/1427* (2013.01); *A23C 13/16* (2013.01); *A23C 19/076* (2013.01); *A23C 2210/202* (2013.01); *A23C 2260/05* (2013.01); *A23V 2002/00* (2013.01); *A23V 2300/24* (2013.01); *A23V 2300/34* (2013.01); *A23V 2300/50* (2013.01)

(58) Field of Classification Search
CPC ..... A23C 9/1422; A23C 9/123; A23C 9/1307; A23C 9/1427; A23C 13/16; A23C 19/076; A23C 2210/202; A23C 2260/05; A23V 2002/00; A23V 2300/24; A23V 2300/34; A23V 2300/50
See application file for complete search history.

(56) References Cited

U.S. PATENT DOCUMENTS

| | | | |
|---|---|---|---|
| 2,682,467 A | * | 6/1954 | Brereton ............ A23C 9/1512 426/580 |
| 4,341,801 A | | 7/1982 | Weissman |
| 4,586,515 A | | 5/1986 | Berger |
| 2003/0077357 A1 | | 4/2003 | Rizvi et al. |
| 2013/0196030 A1 | | 8/2013 | Criezis et al. |

FOREIGN PATENT DOCUMENTS

| | | | |
|---|---|---|---|
| EP | 2 052 626 | | 4/2009 |
| WO | 83/03523 | | 4/1983 |
| WO | 83/03534 | | 10/1983 |
| WO | 01/41578 | | 6/2001 |
| WO | 02/080691 | | 10/2002 |
| WO | WO2010011129 | * | 1/2010 |
| WO | 2012/110706 | | 8/2012 |

OTHER PUBLICATIONS

What Proteins are in Milk? 2018. https://socratic.org/questions/what-proteins-are-in-milk.*
International Search Report for PCT/FI2016/050878, dated Mar. 22, 2017, 4 pages.
Written Opinion of the ISA for PCT/FI2016/050878, dated Mar. 22, 2017, 8 pages.
Search Report for FI 20155958, dated Jul. 14, 2016, 2 pages.
Rasic et al., "Nutrient Yoghurt From Low Lactose Milk Using a Combined Lactase-Uf Retentate Procedure", Milchwissenschaft, VV Gmbh, vol. 47, No. 1, Jan. 1, 1992, pp. 32-35.
Tamime et al., "The production of 'Labneh' by ultrafiltration: a new technology", Journal of the Society of Dairy Technology, vo. 42, No. 2, May 1, 1989, pp. 35-39.
Solanki et al., "Physico-Chemical Properties of Skim Milk Retentates from Microfiltration", Journal of Dairy Science, vol. 84, No. 11, Nov. 1, 2001, pp. 2381-2391.
Action issued in corresponding EP App No. 16 819 590.7 (dated Nov. 12, 2020), 6 pages.
Result of Consultation issued in corresponding EP App No. 16 819 590.7 (dated Nov. 18, 2020), 3 pages.

* cited by examiner

*Primary Examiner* — Anthony J Weier
(74) *Attorney, Agent, or Firm* — Nixon & Vanderhye P.C.

(57) ABSTRACT

The invention relates to a method for producing an acidified milk product including the steps of: providing a milk raw material; concentrating the milk raw material by membrane filtration to provide a filtration retentate; acidifying the filtration retentate with an acidic aqueous solution to provide an acidified filtration retentate having a pH in the range of about 5.2 to about 6.5, a calcium/protein ratio of at most about 0.03, and a phosphorous/protein ratio of at most about 0.025; processing the acidified filtration retentate to the acidified milk product having moisture on a fat-free basis of at least 70%. The invention also relates to an acidified milk product having moisture on a fat-free basis of at least 70% and a calcium/casein ratio of at most about 0.04 and a calcium/protein ratio of at most about 0.03 and a phosphorous/casein ratio of at most about 0.03. The invention also relates to an acidified milk product having moisture on a fat-free basis of at least 70%, a calcium/casein ratio of at most about 0.04, a calcium/protein ratio of at most about 0.03 and a phosphorous/protein ratio of at most about 0.025.

21 Claims, 1 Drawing Sheet

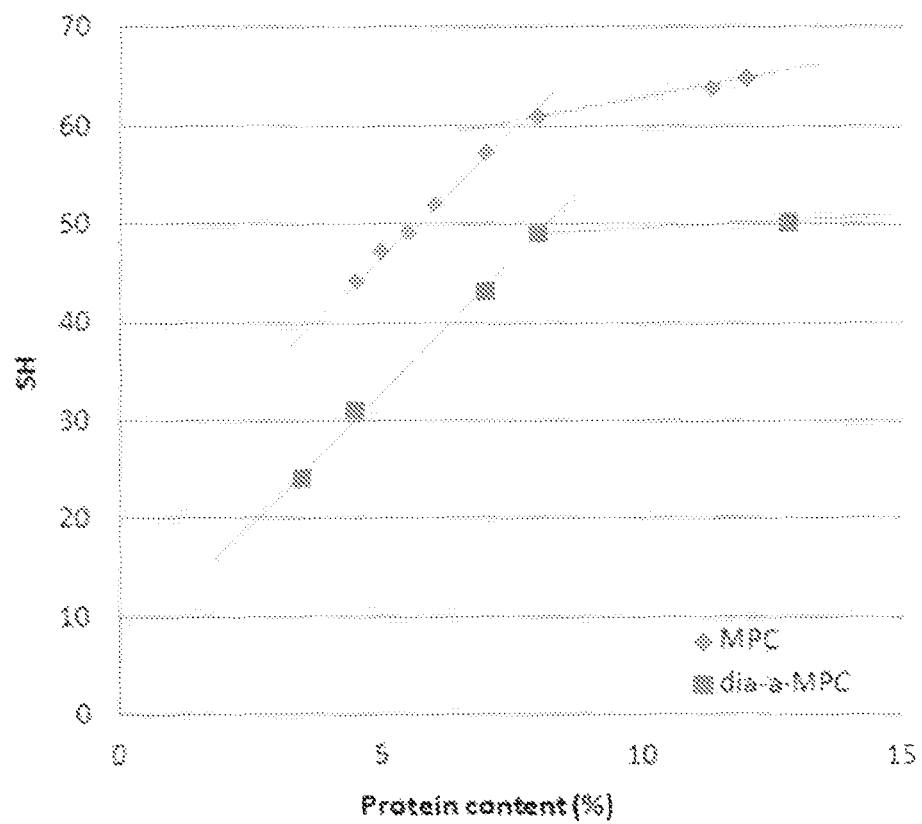

MODIFICATION OF MINERAL COMPOSITION OF MILK FOR THE PRODUCTION OF AN ACIDIFIED MILK PRODUCT

This application is the U.S. national phase of International Application No. PCT/FI2016/050878 filed 15 Dec. 2016, which designated the U.S. and claims priority to FI Patent Application No 20155958 filed 16 Dec. 2015, the entire contents of each of which are hereby incorporated by reference.

FIELD OF THE INVENTION

The present invention relates to modification of a mineral composition of milk using membrane filtration(s). Milk with a modified mineral composition can be utilized in the preparation of acidified milk products with appealing sensory properties.

BACKGROUND OF THE INVENTION

Production of fresh acidified milk products is well known to those familiar with the art. Production of high protein products, such as quarks, Greek yoghurts and fresh cheeses, typically involves a concentration step after acidification, where acidic liquid, commonly described as "acid whey", formed in the acidification is removed from the coagulated/acidified/gelled mass by draining using centrifugal separator and/or membrane filtration(s). The acid whey typically contains lactose, milk minerals, metabolic products such as lactic acid, and a quantity of whey proteins. The composition of the acid whey depends on the preceding heat treatment of milk carried out before acidification, and an acidifying medium used. A main portion of lactose of milk is caught in acid whey. Since the solubility of calcium phosphate is pH-dependent and colloidal calcium phosphate dissolves at low pHs, the acid whey also contains the major portion of dissolved calcium and phosphates. At present, acid whey constitutes a by-product which has low economical value.

There is also a method in which acidified milk products are produced without acid whey separation. The problems of the products prepared by this method lie in the organoleptic properties. More specifically, due to the presence of acid whey, these products have unpalatable, strong sensory acidity and a bitter taste caused by a substantial amount of calcium in the product. Especially, it has been challenging to prepare high protein acidified milk products without impairing the sensory properties, such as taste, of the products.

It is well known that high buffering capacity of milk is because of high concentration of insoluble calcium and phosphates bound in casein micelles. The buffering capacity is increased when milk is concentrated, e.g. by ultrafiltration or microfiltration, due to concentration of casein micelles. It is also well known that lowering the pH of milk the calcium content and thus the buffering capacity of milk are reduced, since the solubilisation of calcium and phosphate is increased. Generally, a high amount of an acidifying medium is needed in the current methods for producing acidified milk products due to the high buffering capacity of milk.

We have now found a method in which the problems of the current methods for producing acidified milk products are avoided.

BRIEF DESCRIPTION OF THE INVENTION

In an aspect, the present invention provides a method for producing an acidified milk product, comprising the following steps:

providing a milk raw material, concentrating the milk raw material by membrane filtration to provide a filtration retentate, acidifying the filtration retentate with an acidic aqueous solution to provide an acidified filtration retentate having a pH of in the range of about 5.2 to about 6.5, specifically about 5.4 to about 5.7, a calcium/protein ratio of at most about 0.03, specifically at most about 0.025, more specifically at most about 0.02, and a phosphorous/protein ratio of at most about 0.025, specifically at most about 0.018, more specifically at most about 0.016, processing the acidified filtration retentate to the acidified milk product having moisture on a fat-free basis of at least 70%.

The method of the present invention is based on idea that lactose and soluble minerals, including monovalent minerals (sodium and potassium) and divalent calcium and magnesium are first extensively separated by a membrane filtration from higher molecular components, e.g. protein and fat, whereby said lactose and soluble minerals are recovered in a pH neutral permeate fraction. pH neutral permeate can be produced up to about ¾ of the feed volume. The resultant milk protein concentrate with reduced lactose and milk mineral contents is then acidified. Production of a low value acid whey with a substantial amount of lactose is thus avoided. Further, the amount of calcium, causing bitter taste, in the acidified product is advantageously reduced.

During the acidification, the solubility of calcium and phosphate is increased. Due to the reduced calcium and phosphate contents in the milk protein concentrate, the buffering capacity of the milk protein concentrate is advantageously reduced in the method of the invention. The lowered buffering capacity beneficially results in reduced amounts of acid needed for acidification of the concentrate to a final acidified milk product with the desired pH value.

The acidified milk products prepared by the method of the invention have appealing sensory properties, such as mild and soft taste. The method allows the preparation of acidified milk products with high protein content which do not have unpalatable strong acid and/or bitter taste, without removal of acid whey.

The invention thus provides an enhanced cost-effective method for producing acidified milk products with appealing organoleptic properties and mouthfeel. Especially, high protein acidified milk products with good sensory properties can be prepared without removal of acid whey. Further, an advantage of the invention is that formation of low-value side streams, such as lactose-containing acid whey, is substantially reduced. Instead, a main portion of lactose is recovered in the present invention before acidification in a neutral fraction and can be easily used in the preparation of further milk products, e.g. milk powders.

In another aspect, the present invention provides an acidified milk product having moisture on a fat-free basis of at least 70%, a calcium/casein ratio of at most about 0.04, a calcium/protein ratio of at most about 0.03, and a phosphorous/casein ratio of at most about 0.03.

In a further aspect, the present invention provides an acidified milk product having moisture on a fat-free basis of at least 70%, a calcium/casein ratio of at most about 0.04, a calcium/protein ratio of at most about 0.03 and a phosphorous/protein ratio of at most about 0.025.

BRIEF DESCRIPTION OF THE DRAWINGS

FIG. 1 shows the titratable acidity SH vs. protein content (%) of an embodiment of the acidified milk product of the invention ("dia-a-MPC") and that of a prior art product ("MPC").

DETAILED DESCRIPTION OF THE INVENTION

In an aspect, the present invention provides a method for producing an acidified milk product, comprising the following steps:
providing a milk raw material,
concentrating the milk raw material by membrane filtration to provide a filtration retentate,
acidifying the filtration retentate with an acidic aqueous solution to provide an acidified filtration retentate having a pH of in the range of about 5.2 to about 6.5, specifically about 5.4 to about 5.7, a calcium/protein ratio of at most about 0.03, specifically at most about 0.025, more specifically at most about 0.02, and a phosphorous/protein ratio of at most about 0.025, specifically at most about 0.018, more specifically at most about 0.016,
processing the acidified filtration retentate to the acidified milk product having moisture on a fat-free basis of at least 70%.

In the present invention,
the term "milk raw material" may be milk as such obtained from an animal, such as a cow, sheep, goat, camel, mare or any other animal that produces milk suitable for human consumption.

The milk raw material can be pre-processed as desired to adjust fat and/or lactose content and/or casein/whey protein ratio to a desired level. Further, the milk raw material can be pretreated in order to lower its microbial load in a manner generally known in the art. Pathogenic and spoilage microorganisms removal is generally carried out by physical separation such as microfiltration, bactofugation or a combination thereof.

If desired, the lactose content of the milk raw material can be reduced. In an embodiment, lactose content is reduced enzymatically by adding a lactase to the raw material. Lactases typically used in the lactose hydrolysis of milk can be used. The lactose content can also be reduced by other suitable means generally known in the art, such as by means of membrane filtration, chromatography, electrodialysis, crystallization, centrifugation, or precipitation. Various techniques can be combined in an appropriate manner. The low lactose raw material can be further lactose-hydrolyzed to provide a lactose-free milk raw material.

In the present invention, the milk raw material can be, for instance, full-fat (whole) milk, cream, low fat milk, skim milk, buttermilk, colostrum, low-lactose milk, lactose-free milk, whey protein depleted milk, Ca depleted milk, reconstituted (recombined) milk from milk powder, or a combination thereof as such or as a concentrate and pre-treated as described above.

In an embodiment, the milk raw material is derived from bovine milk.

In another embodiment, the milk raw material is skim milk.

The milk raw material can contain protein of vegetable origin.

The milk raw material is subjected to a membrane filtration to concentrate protein and to reduce sugars and minerals. Concentration provides a milk protein concentrate as a filtration retentate while sugars and minerals pass through the membrane into a permeate. The nominal pore size of the membrane used in the filtration is in the range of about 0.001 µm to about 1.0 µm (1 to 1000 kDa). Examples of suitable membrane filtrations include microfiltration, ultrafiltration and nanofiltration. In an embodiment, the membrane filtration is ultrafiltration. In an embodiment, the cut-off value of the ultrafiltration membrane is in the range of about 1 kDa to about 50 kDa. In another embodiment, the cut-off value of the ultrafiltration membrane is in the range of about 1 kDa to about 10 kDa. In a further embodiment, the membrane filtration is microfiltration. In an embodiment, the nominal pore size of the microfiltration membrane is in the range of about 0.1 µm to about 1.0 µm. In another embodiment, the nominal pore size of the microfiltration membrane is in the range of about 0.5 µm to about 1.0 µm.

The milk raw material is concentrated by a concentration factor of about 1 to about 7. In an embodiment, the concentration factor is about 1 to about 4. The milk raw material is concentrated so as to provide a protein content of about 3% to about 25% based on weight of the milk protein concentrate. In an embodiment, the protein content of the milk protein concentrate is about 6% to about 15%.

The membrane filtration is carried out at a temperature of about 5° C. to about 55° C. In an embodiment, the temperature range is from about 5° C. to about 25° C. In another embodiment, the temperature range is from about 10° C. to about 15° C. In a further embodiment, the membrane filtration is carried out at about 10° C.

In an embodiment, the concentration is carried out by ultrafiltration at 10° C. In another embodiment, the concentration is carried out by ultrafiltration at 10° C. by a concentration factor of 4.

The concentration of the milk raw material provides a milk protein concentrate which has a modified whey protein to casein ratio, or a native whey protein to casein ratio present in the milk raw material. The whey protein to casein ratio of the concentrate is in the range of about 20:80 to about 4:96. In an embodiment, the ratio is about 20:80. The native whey protein to casein ratio of 20:80 of bovine milk is conveniently modified by microfiltration whereby casein is retained in the microfiltration retentate while whey protein passes through the membrane to a microfiltration permeate. The whey protein to casein ratio can be adjusted up to about 4:96 in the microfiltration. In the ultrafiltration, both casein and whey protein are retained in the retentate. Ultrafiltration thus provides a milk protein concentrate with unmodified whey protein to casein ratio, and is typically about 20:80.

The filtration permeate obtained from the concentration can be subjected to further membrane filtration(s), including ultrafiltration, nanofiltration and reverse osmosis, to separate sugars, minerals, and optionally whey protein, into different fractions. A skilled person in the art can select a suitable membrane filtration for each separation process. Fractions obtained from these further membrane filtrations can be used as diawater in the subsequent diafiltration step employed in the method of the invention, described below. In an embodiment, monovalent milk minerals removed in the concentration are recovered by membrane filtration(s) and returned to the milk protein concentration in the diafiltration by using a fraction enriched with monovalent milk minerals as diawater. Further, precipitation methods can be used to remove undesirable substances, such as calcium and phosphates, from the permeate, i.e., by elevating the temperature to a range of about 50° C. to about 80° C., and/or adjusting the pH to above 7.0. In an embodiment, the pH is adjusted to a range of about 7.0 to about 7.5. The calcium- and phosphate-depleted permeate is suitable for use as diawater. The calcium- and phosphate-depleted permeate can also be used with the calcium and phosphate depleted retentate to make the final product.

In the method of the invention, the filtration retentate, i.e. the milk protein concentrate, is subjected to acidification. In the acidification, pH of the retentate is adjusted to about 5.2 to about 6.5. In an embodiment, the pH is adjusted to about 5.4 to about 5.7. The acidification reduces the buffering capacity of the milk protein concentrate by dissolving calcium and phosphate from casein micelles present in the concentrate.

The acidified filtration retentate has a reduced calcium and phosphorous content. In an embodiment, the calcium/protein ratio of the acidified filtration retentate is at most about 0.03. In another embodiment, the calcium/protein ratio is at most about 0.025. In a further embodiment, the calcium/protein ratio is at most about 0.02. In an embodiment, the phosphorous/protein ratio of the acidified filtration retentate is at most about 0.025. In another embodiment, the phosphorous/protein ratio is at most about 0.018. In a further embodiment, the phosphorous/protein ratio is at most about 0.016.

In an embodiment, the calcium/casein ratio of the acidified filtration retentate is at most about 0.04. In another embodiment, the calcium/casein ratio is at most about 0.035. In a further embodiment, the calcium/casein ratio is at most about 0.028. In an embodiment, the phosphorous/casein ratio of the acidified filtration retentate is at most about 0.03. In another embodiment, the phosphorous/casein ratio is at most about 0.022. In a further embodiment, the phosphorous/casein ratio is at most about 0.018.

In an embodiment, the protein content of the acidified filtration retentate is in the range of about 2% to about 25% based on weight of the product. In another embodiment, the protein content is about 3% to about 5%. In a further embodiment, the protein content is about 6% to about 15%. In a still further embodiment, the protein content is about 8% to about 12%.

In an embodiment, the method of the invention comprises a diafiltration step. In the diafiltration, the filtration retentate is diluted with an aqueous solution and the mixture is led through the same filtration membrane. Diafiltration does not substantially modify the ratio of whey protein to casein of the retentate.

The acidification can be carried out before the milk protein concentrate is diafiltered, or during the diafiltration of the concentrate. When the acidification is carried out before diafiltration, the acidified milk protein concentrate obtained is conveniently diafiltered using a pH neutral aqueous solution as diawater to enhance the dissolution of calcium and phosphate from the concentrate.

Examples of suitable aqueous solutions are, without limiting thereto, tap water and various filtration permeate fractions described above.

In an embodiment, the acidification is carried out during the diafiltration. In this embodiment, an acidic aqueous solution is used as diawater to adjust the pH of the diafiltration retentate to about 5.2 to about 6.5. In an embodiment, the pH is adjusted to about 5.4 to about 5.7. The pH of the acidic aqueous solution is at most of about 6.5. The acidic aqueous solution comprises any suitable food grade acid(s), such as lactic acid and citric acid, glucono-delta-lactone (GDL), carbon dioxide, organic acid, or a mixture thereof.

The acidified diafiltration retentate has a protein content in the range of about 2% to about 25%. In another embodiment, the protein content is about 3% to about 5%. In a further other embodiment, the protein content is about 6% to about 15%. In a still further embodiment, the protein content is about 8% to about 12%.

The acidified diafiltration retentate has a reduced calcium and phosphorous content. In an embodiment, the calcium/protein ratio of the acidified diafiltration retentate is at most about 0.03. In another embodiment, the calcium/protein ratio is at most about 0.025. In a further embodiment, the calcium/protein ratio is at most about 0.02. In an embodiment, the phosphorous/protein ratio of the acidified diafiltration retentate is at most about 0.025. In another embodiment, the phosphorous/protein ratio is at most about 0.018. In a further embodiment, the phosphorous/protein ratio is at most about 0.016.

In an embodiment, the calcium/casein ratio of the acidified diafiltration retentate is at most about 0.04. In another embodiment, the calcium/casein ratio is at most about 0.035. In a further embodiment, the calcium/casein ratio is at most about 0.028. In an embodiment, the phosphorous/casein ratio of the acidified diafiltration retentate is at most about 0.03. In another embodiment, the phosphorous/casein ratio is at most about 0.022. In a further embodiment, the phosphorous/casein ratio is at most about 0.018.

In an embodiment, the milk raw material is subjected to a heat treatment. The heat treatment can be carried out before the concentration of the milk raw material, between the concentration and the diafiltration, or after the concentration and diafiltration. If the heat treatment is performed on the acidified milk protein concentrate, i.e. diafiltration retentate, obtained from the concentration and the following diafiltration, the pH of the acidified diafiltration retentate may first be adjusted to a neutral level. In an embodiment, the heat treatment is carried out before the concentration. In another embodiment, the heat treatment is carried out after the concentration. The heat treatment is performed at a temperature of about 75° C. to about 98° C. for about 15 sec to about 30 min, including typical pasteurization and high pasteurization conditions. In an embodiment, the heat treatment is high pasteurization at about 80° C. for about 7 min. In another embodiment, the heat treatment is high pasteurization at about 90° C. for about 5 min.

In an embodiment of the method of the invention, skim milk is high pasteurized at about 80° C. for about 7 min, the pasteurized skim milk is concentrated by ultrafiltration at 10° C. by concentration factor of 4.0 to a protein content of about 11%, the ultrafiltration retentate is diafiltered by an acidic aqueous solution containing lactic acid, lactose and milk minerals to provide a diafiltration retentate.

The acidified filtration retentate or the acidified diafiltration retentate is further processed to an acidified milk product by adding a suitable acidifying agent to the retentate, depending on the type of the acidified product to be produced. Additional ingredients can be added to the retentate prior to this acidification step, including milk raw material such as cream, milk protein, lactose, milk salts and water, in order to adjust the total solids and/or the contents of protein, fat, lactose and/or milk minerals to desired levels. The acidification can be carried out microbiologically and/or chemically in a conventional manner. Microbiological acidification can be performed utilizing starter cultures. Chemical acidification is done by adding a chemical starter, organic acids and/or inorganic acids as an acidifying agent, such as glucono-delta-lactone (GDL), citric acid, lactic acid. Natural acids from berries and fruit, such as the benzoic acid of lingonberry, can also be used. In an embodiment, the acidification is fermentation. A skilled person in the art can easily select a suitable acidifying agent and amount thereof for each type of an acidified milk product.

In an embodiment, the moisture on a fat-free basis (MFFB) of the acidified milk product prepared by the method of the invention is at least 80%. In another embodiment, the MFFB is at least 85%.

The acidified milk product prepared by the method of the invention is, for example, quark, yoghurt, crème fraiche or cream cheese (fresh cheese). In an embodiment, the acidified milk product is prepared by direct fermentation, i.e., without removal of acid whey. This embodiment is suitable for the production of cream cheese, quark, yoghurt, crème fraiche, specifically yoghurt. In another embodiment, the acidified milk product is prepared by removing acid whey from the product using sieving and/or separation. Both embodiments allow the preparation of acidified milk products with high protein content.

The calcium/casein ratio, phosphorous/casein ratio, calcium/protein ratio and phosphorous/protein ratio of the acidified milk product prepared by the method are substantially the same as those defined above for the acidified diafiltration retentate.

The acidified milk product prepared by the method of the invention has a total solids content in the range of about 5% to about 40%. In an embodiment, the total solids is about 5% to about 25%. In another embodiment, the total solids is about 8% to about 25%. In a further embodiment, the total solids is about 25% to about 35%.

The protein content of the acidified milk product prepared by the method of the invention is in the range of about 2% to about 25% based on weight of the product. In an embodiment, the protein content is about 3% to about 5%. In another embodiment, the protein content is about 6% to about 15%. In a further embodiment, the protein content is about 8% to about 12%.

The pH of the acidified milk product prepared by the method of the invention is in the range of about 4.0 to about 5.0. In an embodiment, the pH is about 4.55 to about 4.8.

FIG. 1 shows the titratable acidity (SH) vs. protein content (%) of an embodiment of the acidified milk product of the invention ("dia-a-MPC") and that of a prior art product ("MPC"). SH is a measure of the amount of acid present in a product. Here, the SH was determined by Mettler Toledo DL50 Graphix-titrator as follows: The acidified milk sample (10 ml) was mixed with 30 ml of Millipore water. The mixture was titrated at room temperature with 0.1 M NaOH up to pH of 8.55, and the amount of titrant consumed was calculated to correspond to the volume (ml) of 0.25 M NaOH needed to titrate 100 ml of sample to pH value of 8.3, according to the original Soxhlet-Henkel-degree (° SH).

In FIG. 1, the acidified milk product of the invention is made from the milk protein concentrate obtained in Example 2, employing acid diafiltration. The prior art product is made of milk protein concentrate of Example 1. It can be seen that the SH of the product of the invention is lower than that of the prior art product. SH depends on protein content and the end pH value of the product after fermentation. Approximately, a reduction of 10 units in SH is achieved by the method of the invention on a wide range of protein contents.

In another aspect, the invention provides an acidified milk product having moisture on a fat-free basis of at least 70%, a calcium/casein ratio of at most about 0.04, a calcium/protein ratio of at most about 0.03 and a phosphorous/casein ratio of at most about 0.03. In an embodiment, the calcium/casein ratio is at most about 0.035. In another embodiment, the calcium/casein ratio is at most about 0.028. In an embodiment, the calcium/protein ratio is at most about 0.025. In a further embodiment, the calcium/protein ratio is at most about 0.02. In an embodiment, the phosphorous/casein ratio is at most about 0.022. In an embodiment, the phosphorous/casein ratio is at most about 0.018. In an embodiment, the phosphorous/protein ratio of the acidified milk product is at most about 0.025. In another embodiment, the phosphorous/protein ratio is at most about 0.018. In a further embodiment, the phosphorous/protein ratio is more specifically at most about 0.016.

In a further aspect, the invention provides an acidified milk product having moisture on a fat-free basis of at least 70%, a calcium/casein ratio of at most about 0.04, a calcium/protein ratio of at most about 0.03 and a phosphorous/protein ratio of at most about 0.025. In another embodiment, the phosphorous/protein ratio is at most about 0.018. In a further embodiment, the phosphorous/protein ratio is at most about 0.016. In an embodiment, the calcium/casein ratio is at most about 0.035. In another embodiment, the calcium/casein ratio is at most about 0.028. In an embodiment, the calcium/protein ratio is at most about 0.025. In a further embodiment, the calcium/protein ratio is at most about 0.02. In an embodiment, the phosphorous/casein ratio of the acidified milk product is at most about 0.03. In another embodiment, the phosphorous/casein ratio is at most about 0.022. In a further embodiment, the phosphorous/casein ratio is at most about 0.018.

In an embodiment, the moisture on a fat-free basis (MFFB) of the acidified milk products of the invention is at least 80%. In another embodiment, the MFFB of the products is at least 85%.

The acidified milk products of the invention have a total solids content in the range of about 5% to about 40%. In an embodiment, the total solids is about 5% to about 25%. In another embodiment, the total solids is about 8% to about 25%. In a further embodiment, the total solids is about 25% to about 35%.

The protein content of the acidified milk products of the invention is in the range of about 2% to about 25% based on weight of the product. In an embodiment, the protein content is about 3% to about 5%. In another embodiment, the protein content is about 6% to about 15%. In a further embodiment, the protein content is about 8% to about 12%.

The pH of the acidified milk products of the invention is in the range of about 4.0 to about 5.0. In an embodiment, the pH is about 4.55 to about 4.8.

The acidified milk products of the invention include, but are not limited to, high protein quark, high protein Greek yoghurt, high protein fresh cheese. In an embodiment, the acidified milk products are high protein yoghurts.

The following examples are presented for further illustration of the invention without limiting the invention thereto.

Example 1

Milk Protein Concentrate

40 L of skim milk was high pasteurized at 80° C. for 7 min (dynamic pasteurisator), cooled to 10° C. and batch concentrated by ultrafiltration until concentration factor of 4.0 was reached. Spiral-wound element with Koch HFK131, 2540 having 10 kDa molecular weight cut-off (MWCO) was used. The pH of the ultrafiltration retentate was 6.8 and the titratable acidity SH was 10.9. Protein content of the retentate was 11.8%. The composition of the milk protein concentrate, i.e. the ultrafiltration retentate, is given in Table 1 below.

Example 2

Acid Diafiltration of the Milk Protein Concentrate

The ultrafiltration retentate prepared in Example 1 was diafiltered with an acidic aqueous solution as a diafiltration liquid, containing lactic acid (1.5%) and monovalent milk minerals, i.e. sodium and potassium. The aqueous solution contained monovalent minerals in similar concentrations as the UF permeate obtained during the ultrafiltration concentration conducted in Example 1, i.e. only di- and multivalent ions were reduced. The pH of the feed was kept above 5.7 by adding water instead of the acidified nanofiltration permeate when needed. In total, 20 L of the diafiltration liquid was added to the ultrafiltration retentate in 1 L batches. The resultant diluted mixture was passed through the spiral element used in Example 1. No protein precipitation was observed. In concentration phase, half of the total lactose was collected in the ultrafiltration permeate. pH and SH of the diafiltration retentate were 5.9 and 21.2, respectively.

A milk protein concentrate with a modified mineral composition as a diafiltration retentate was obtained. The composition of the milk protein concentrate derived from the acid diafiltration is given in Table 1 below.

Reference Example 3

Diafiltration of the Milk Protein Concentrate with Water

The ultrafiltration retentate prepared in Example 1 was diafiltered in the same manner as described in Example 2 except that water was used as the diafiltration liquid. The composition of the milk protein concentrate with a modified mineral composition obtained from the water diafiltration is given in Table 1 below.

TABLE 1

|  | Skim milk | Milk protein concentrate (UF retentate; Example 1) | Milk protein concentrate (acid diafiltration; Example 2) | Milk protein concentrate (water diafiltration; Reference Example 3) |
|---|---|---|---|---|
| Protein (%) | 3.3 | 11.8 | 12.8 | 12.4 |
| Lactose (%) | 4.2 | 4.3 | 0.5 | 0.5 |
| Ash (%) | 0.7 | 1.4 | 0.9 | 1.0 |
| Na (mg/kg) | 330 | 410 | 110 | 120 |
| K (mg/kg) | 1400 | 1760 | 470 | 510 |
| Ca (mg/kg) | 1100 | 3140 | 2500 | 3100 |
| Mg (mg/kg) | 100 | 210 | 110 | 150 |
| P (mg/kg) | 850 | 2230 | 1740 | 1960 |
| Ca/P | 1.29 | 1.41 | 1.44 | 1.58 |

Example 4

High Protein Yoghurt

The mineral-modified milk protein concentrate prepared in Example 2 was supplied with lactose powder to adjust the final lactose content to 4%. The mixture was then acidified with a commercial yoghurt culture at 42° C. until pH 4.8 was reached. Titratable acidity of the resultant yoghurt was SH 50. The MFFB of the yoghurt was 82.3%.

Reference fermentation was performed on the milk protein concentrate obtained in Example 1 with essentially the same protein and lactose composition. Titratable acidity SH of the reference yoghurt with ca. 11.3% protein was 64. The MFFB of the yoghurt was 82.5%.

The sensory evaluation revealed a significant difference between the yoghurt of the present invention and the reference yoghurt, the yoghurt of the present invention being much more mildly flavoured than the reference yoghurt.

Example 5

High Protein Yoghurt

In total five yoghurt samples were prepared using milk protein concentrate (MPC, as in example 1), and milk protein water diafiltration retentate (dia-w-MPC, as in reference example 3) and three acid diafiltration retentates (dia-a-MPC, as in example 2). Acidic diafiltration was performed 1) with lactic acid solution keeping the permeate pH at 5.7 (dia-a-MPC1), 2) as dia-a-MPC1 but with added KCl (dia-a-MPC2) and 3) as dia-a-MPC1 but at pH 5.4 (dia-a-MPC3). The composition of the retentates is shown in Table 2.

TABLE 2

|  | MPC | Dia-w-MPC | Dia-a-MPC1 | Dia-a-MPC2 | Dia-w-MPC3 |
|---|---|---|---|---|---|
| Protein (%) | 11.8 | 11.8 | 11.8 | 11.8 | 11.8 |
| Lactose (%) | 4.3 | 0.5 | 0.6 | 0.5 | 0.5 |
| Na (mg/kg) | 406 | 110 | 72 | 57 | 50 |
| K (mg/kg) | 1760 | 480 | 290 | 1100 | 270 |
| Ca (mg/kg) | 3140 | 2600 | 1800 | 1800 | 1200 |
| Mg (mg/kg) | 210 | 140 | 86 | 82 | 59 |
| P (mg/kg) | 2233 | 1600 | 1300 | 1300 | 1000 |
| Ca/protein | 0.026 | 0.022 | 0.015 | 0.015 | 0.010 |
| P/protein | 0.019 | 0.014 | 0.011 | 0.011 | 0.008 |

The retentates were formulated into 7% protein content and pasteurised at 80° C. with 5 min holding time. For MPC, dilution with skim milk was used, whereas the diafiltration retentates were diluted using water, lactose and milk mineral concentrate. The mixtures were then acidified with a commercial yoghurt culture at 42° C. until pH 4.55 was reached. The set type yoghurts were then cooled and their composition and titratable and sensory acidity was determined (Table 3). The MFFB of the yoghurts was 87%.

TABLE 3

|  | MPC | Dia-w-MPC | Dia-a-MPC1 | Dia-a-MPC2 | Dia-a-MPC3 |
|---|---|---|---|---|---|
| Protein (%) | 7 | 7 | 7 | 7 | 7 |
| Na (mg/kg) | 410 | 430 | 470 | 280 | 270 |
| K (mg/kg) | 1900 | 1800 | 2500 | 2300 | 1900 |
| Ca (mg/kg) | 2000 | 1800 | 1400 | 1200 | 800 |
| Mg (mg/kg) | 160 | 100 | 68 | 58 | 42 |
| P (mg/kg) | 1500 | 1200 | 960 | 900 | 690 |
| SH | 57.3 | 49.8 | 43.4 | 42.7 | 35.1 |
| Sensory acidity score (1-4) n = 6 | 3.3 ± 0.8 | 2.3 ± 0.5 | 1.7 ± 0.5 | 1.8 ± 0.6 | 1.7 ± 0.5 |

Example 6

High Protein Yoghurt

The mineral-modified milk protein concentrates prepared in Example 2 and Reference Example 3 were supplied with lactose powder to adjust the final lactose content to 4%. The mixtures were then acidified with a commercial yoghurt culture at 42° C. until pH 4.65 was reached. Titratable acidity SH of the resultant yoghurt of the invention prepared by using acid diafiltered milk protein concentrate of Example 2 was 61 (protein content ca. 12%), whereas the reference yoghurt prepared by using water diafiltered milk protein concentrate of Reference Example 3 had a value of SH 65 (protein content ca. 12%). The MFFB of both the yoghurt of the invention and the reference yoghurt was 83%. The sensory acidity did not differ considerably, but the water-diafiltered reference had a bitter off-flavour due to the higher content of Ca present.

Example 7

Yoghurt

The mineral-modified milk protein concentrate from example 2 was adjusted with cream, milk salt and water so as to provide a protein content of 4.5% and a fat content of 2%, and acidified with a commercial yoghurt culture at 42° C. until pH 4.55 was reached. Titratable acidity SH of the yoghurt of the invention was 31.

Reference yoghurt was prepared by evaporating fat-standardized (2%) milk to protein content of 4.5%. The milk was then high pasteurized followed by fermentation with the same commercial yoghurt culture at 42° C. until pH 4.55 was reached. The titratable acidity SH of the reference yoghurt was 44. The MFFB of the yoghurt of the invention and that of the reference yoghurt was 93% and 89%, respectively.

Example 8

High Protein Yoghurt

The milk protein concentrate was prepared as in example 1 except that skim milk was not pasteurized prior to ultrafiltration. The milk protein concentrate was then diafiltered as described in Example 2 but using a diafiltration liquid which was obtained as follows: 30 L of fresh acid whey from quark production was nanofiltered with spiral membrane Dow NF, Filmtec, and the permeate obtained was used as an acid diafiltration liquid. Said permeate contained <0.01% of lactose, 1.7% of milk minerals and 1.5% of lactic acid. pH of the feed was kept above 5.7 by adding water instead of the acidified nanofiltration permeate when needed. The diafiltration retentate was adjusted with lactose, milk salts and water so as to provide a protein content of 8% after which the pH was adjusted to 7. The yoghurt milk was pasteurized at 80° C. for 7 min and acidified with commercial yoghurt culture until pH 4.55 was reached. The SH of the product was 43. The MFFB of the yoghurt was 86%.

Reference yoghurt was prepared by diafiltrating the same unpasteurized milk protein concentrate above in accordance with the method described in Reference Example 3. SH of the reference yoghurt was 50. The MFFB of the reference yoghurt was 86%.

The sensory acidity of the yoghurt of the invention and that of the reference yoghurt was 1.75 (scale 1-4, n=6) and 2.33, respectively.

It will be obvious to a person skilled in the art that, as the technology advances, the inventive concept can be implemented in various ways. The invention and its embodiments are not limited to the examples described above but may vary within the scope of the claims.

The invention claimed is:

1. A method for producing an acidified milk product, comprising the following steps:
   providing a milk raw material,
   concentrating the milk raw material by membrane filtration to provide a filtration retentate,
   subjecting the filtration retentate to a diafiltration step,
   acidifying the filtration retentate with an acidic aqueous solution to provide an acidified filtration retentate having a pH of in the range of about 5.2 to about 6.5, a calcium/protein ratio of at most about 0.03, and a phosphorous/protein ratio of at most about 0.025,
   processing the acidified filtration retentate to the acidified milk product having moisture on a fat-free basis of at least 70%,
   wherein the acidification of the filtration retentate is carried out before or during the diafiltration to provide the acidified diafiltration retentate.

2. The method of claim 1, wherein the acidification is carried out during the diafiltration using an acidic aqueous solution as diawater.

3. The method of claim 2, wherein the pH of the acidic aqueous solution is at most about 6.5.

4. The method of claim 1, wherein the protein content of the acidified filtration retentate is in the range of about 2% to about 25%.

5. The method of claim 1, wherein a calcium/casein ratio of the acidified filtration retentate is at most about 0.04.

6. The method of claim 1, wherein a phosphorous/casein ratio of the acidified filtration retentate is at most about 0.03.

7. The method of claim 1, wherein the aqueous acid solution comprises food grade acid(s), glucono-delta-lactone (GDL), carbon dioxide, organic acid, or a mixture thereof.

8. The method of claim 1, wherein the milk raw material is subjected to heat treatment before the concentration of the milk raw material, between the concentration and the diafiltration, or after the concentration and diafiltration.

9. The method of claim 8, wherein the heat treatment is carried out at a temperature of about 75° C. to about 98° C. for about 15 sec to about 30 min.

10. The method of claim 1, wherein the nominal pore size of the membrane used in the filtration is in the range of about 0.001 μm to about 1.0 μm (1 to 1000 kDa).

11. The method of claim 1, wherein the membrane filtration is selected from microfiltration, ultrafiltration and nanofiltration.

12. The method of claim 1, wherein the concentration factor of the membrane filtration is in the range of about 1 to about 7.

13. The method of claim 1, wherein the concentration of the milk raw material by membrane filtration is carried out at a temperature of about 5° C. to about 55° C.

14. The method of claim 1, wherein the acidified milk product is quark, yoghurt, crème fraiche, or cream cheese, and is prepared by direct fermentation without removal of acid whey.

15. A method for producing an acidified milk product, comprising the following steps:

providing a milk raw material,
concentrating the milk raw material by membrane filtration to provide a filtration retentate,
subjecting the filtration retentate to a diafiltration step,
acidifying the filtration retentate with an acidic aqueous solution to provide an acidified filtration retentate having a pH of in the range of about 5.2 to about 6.5, a calcium/protein ratio of at most about 0.03, and a phosphorous/protein ratio of at most about 0.025,
processing the acidified filtration retentate to the acidified milk product having moisture on a fat-free basis of at least 70%,
wherein the acidification of the filtration retentate is carried out before or during the diafiltration to provide the acidified diafiltration retentate, wherein the acidified milk product is high protein quark or high protein Greek yoghurt and is prepared with removal of acid whey.

16. An acidified milk product having moisture on a fat-free basis of at least 70% and a calcium/casein ratio of at most about 0.04, and a calcium/protein ratio of at most about 0.03, and a phosphorous/casein ratio of at most about 0.03, wherein the acidified milk product is high protein quark or high protein Greek yoghurt.

17. The product of claim 16, wherein a phosphorous/protein ratio of the product is at most about 0.025.

18. The method of claim 1, wherein a total solids content of the product is in the range of about 5% to about 40%.

19. The method of claim 1, wherein the protein content of the acidified milk product is in the range of about 2% to about 25% based on weight of the product.

20. The method of claim 1, wherein the acidified milk product has a pH in the range of about 4.0 to about 5.0.

21. The method of claim 1, wherein the moisture on a fat-free basis is at least 80%.

* * * * *